(12) United States Patent
Alshami et al.

(10) Patent No.: US 11,170,909 B2
(45) Date of Patent: Nov. 9, 2021

(54) SUNFLOWER SEED SHELL DIELECTRIC SUBSTRATES

(71) Applicant: The University of North Dakota, Grand Forks, ND (US)

(72) Inventors: Ali Saleh Alshami, Grand Forks, ND (US); Sima Noghanian, Poway, CA (US)

(73) Assignee: The University of North Dakota, Grand Forks, ND (US)

( * ) Notice: Subject to any disclaimer, the term of this patent is extended or adjusted under 35 U.S.C. 154(b) by 57 days.

(21) Appl. No.: 16/353,363

(22) Filed: Mar. 14, 2019

(65) Prior Publication Data

US 2019/0287695 A1  Sep. 19, 2019

Related U.S. Application Data

(60) Provisional application No. 62/642,859, filed on Mar. 14, 2018.

(51) Int. Cl.
| | | |
|---|---|---|
| *H01B 3/18* | (2006.01) | |
| *H01Q 1/38* | (2006.01) | |
| *H01Q 9/30* | (2006.01) | |
| *C10B 53/02* | (2006.01) | |
| *C10B 57/08* | (2006.01) | |
| *C08K 3/04* | (2006.01) | |
| *C10C 1/02* | (2006.01) | |
| *C10B 57/10* | (2006.01) | |

(52) U.S. Cl.
CPC ............ *H01B 3/18* (2013.01); *C08K 3/04* (2013.01); *C10B 53/02* (2013.01); *C10B 57/08* (2013.01); *C10C 1/02* (2013.01); *H01Q 1/38* (2013.01); *H01Q 9/30* (2013.01); *C10B 57/10* (2013.01)

(58) Field of Classification Search
CPC ... H01B 3/18; H01Q 1/38; H01Q 9/30; C08K 3/04; C10B 53/02; C10B 57/08
See application file for complete search history.

(56) References Cited

U.S. PATENT DOCUMENTS

2010/0120128 A1* 5/2010 Liang .................. C01B 32/05
435/266

* cited by examiner

*Primary Examiner* — Robert D Harlan
(74) *Attorney, Agent, or Firm* — Kinney & Lange, P. A.

(57) ABSTRACT

A dielectric substrate made from sunflower seed shells has good moldabiltiy and low water adsorption for use in creating antenna or other devices. The dielectric substrate is made by pyrolizing sunflower seed shells or husks and collecting the resulting tar to create the substrate.

20 Claims, 13 Drawing Sheets

SUNFLOWER SEED SHELL DIELECTRIC SUBSTRATES

CROSS-REFERENCE TO RELATED APPLICATION(S)

This application claims the benefit of U.S. Provisional Application No. 62/642,859 filed Mar. 14, 2018 for "SUNFLOWER SEED SHELL DIELECTRIC SUBSTRATES" by A. S. Alshami and S. Noghanian.

STATEMENT OF GOVERNMENT INTEREST

This invention was made with government support under IIA-1355466 awarded by the National Science Foundation through the North Dakota Experimental Program to Stimulate Competitive Research (EPSCOR). The government has certain rights in the invention.

BACKGROUND

A variety of environmental and economic concerns regarding petroleum based products have arisen in recent years. For instance, petroleum based products are increasingly costly due to non-renewability and ever-growing worldwide demand. Additionally, polycyclic aromatic hydrocarbons, a constituent of petroleum, are known to be toxic in humans and correlate with cancer. Additionally, petroleum refining and production account for about 61% of greenhouse gas emissions in the U.S. according to studies by the Environmental Protection Agency (EPA). Research into eco-friendly petroleum replacements has expanded significantly in the last decade due to these issues.

Petroleum-based plastics provide an array of additional concerns. Potentially harmful toxic compounds, such as bisphenol A (BPA) and di-(2-ethylhexyl)-phthalate (DEHP) are found in petroleum-based plastics. Petroleum-based plastics also have a lack of biodegradability. Over 300 million metric tons of plastics are produced annually, and about half of that is for disposable applications (of which 85% are medical applications). Disposal options for plastics in general include landfilling, incineration, recycling, biodegredation, and down gauging. Many types of plastics can be recycled or biodegraded. But petroleum-based plastics must be landfilled or incinerated, both of which produce negative environmental and health effects.

These concerns have created an impetus for alternative biomass research. Bio-based materials offer clean and innovative replacements to petroleum. However, production costs of biomass products, in addition to market competition, prevent many biomass products from being commercialized. Nonetheless, products created from bio-waste materials offer a relatively inexpensive alternative to biomass products while maintaining similar characteristics.

SUMMARY

In one embodiment, an article includes a dielectric substrate comprising blackened carbon material created from pyrolized sunflower seed shells.

In another embodiment, a method of making a dielectric substrate includes drying sunflower seed shells, pyrolizing the sunflower seed shells into tar, char, and volatile compounds, collecting the tar, and drying the tar into a dielectric substrate.

In another embodiment, a biodegradable radio frequency antenna includes a dielectric substrate having blackened carbon material created from pyrolized sunflower seed shells. The dielectric substrate has a dielectric constant of between about 2.5 to about 4.0 in super high frequency ranges, a loss tangent measurement of about 0.00 to about 0.42 in super high frequency ranges, a reduce modulus measurement of about 0.39 GPa, a Young's modulus measurement of about 0.35 GPa, a hardness of about 0.98 MPa, and a water absorption of about 0.45 percent.

DETAILED DESCRIPTION

Figure 1:
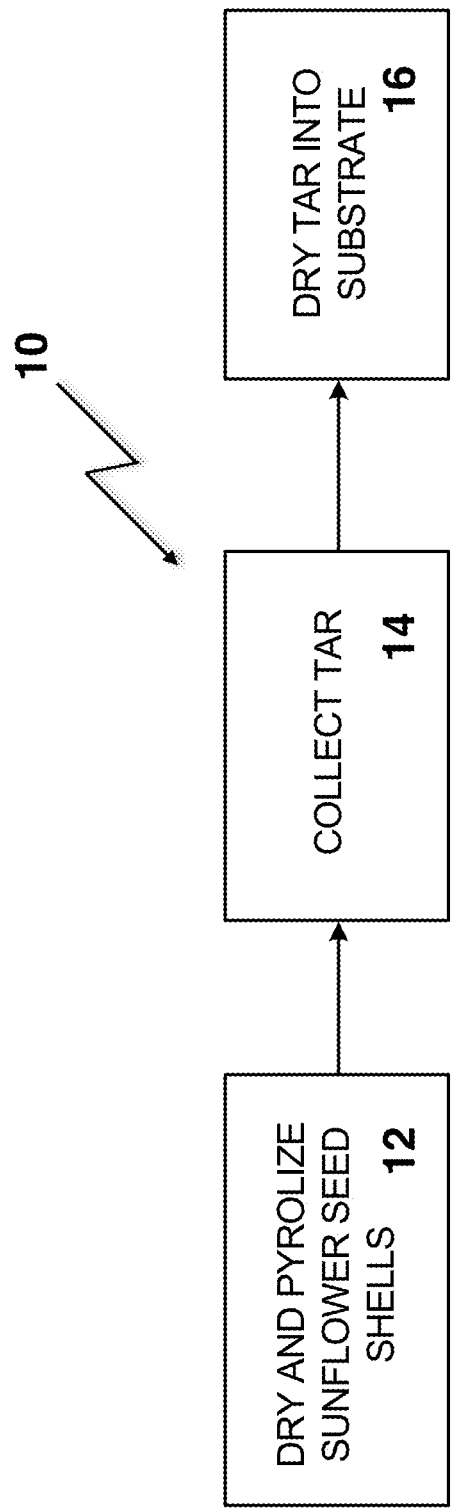
FIG. 1 is a flow chart depicting a method of making bio-based dielectric substrates from sunflower seed shells.

The disclosed method uses a waste product, sunflower seed shells, as a starting material for producing bio-based dielectric substrates to be used, for example, in biocompatible and biodegradable radio frequency antennae (RFA) for medical wireless implanted devices, agricultural monitoring systems and sensors implanted into soil, or other microwave components. Examples of medical wireless implanted devices include cardiac pacemakers and defibrillators, visual prosthetic devices (e.g., devices that can create visual sensation), brain-computer interface (e.g., device for capturing/interpreting neural brain signals and transferring them to a device), ingestible electronic pills (e.g., devices for gastrointestinal tract data collection), wireless capsule endoscopy (also known as video capsule endoscopy), implantable drug delivery systems with programmable release, bioresorbable silicon electronics for spatiotemporal mapping of electrical activity from the cerebral cortex, and bioresorbable intracranial sensors adapted to sense fluid flow, motion, pH, thermal characteristics, or other parameters of interest.

Biocompatible and biodegradable devices are engineered to completely resorb in the human body after fulfilling their therapeutic and diagnostic functions to avoid secondary procedures to remove the implants after their period of use. Equipped with precision sensors/antenna modules combined with integrated processing and telemetry circuitry, wireless implants can remotely monitor a variety of physical and chemical parameters within the human body, and thereby allow an immediate evaluation of an individual's medical conditions.

One example includes a single use biodegradable pressure sensor for cardiovascular monitoring. The sensor includes of a flexible capacitor and has a substrate that may be a laminate of poly(glycerol sebacate) (PGS) in the center and polyhydroxyvalerate (PHB/PHV) on top and bottom. Conductive layers of Magnesium (Mg) and iron (Fe) can be located between PGS and PHB/PHV.

Another example includes a wireless RF MEMS pressure sensor made entirely of biodegradable materials. The sensor includes of a cavity, bounded by two conductors to form a capacitor connected to an inductor coil. The inductor may be used as a part of sensor as well as magnetically coupling the sensor to the external coil. Biodegradable polymers poly(L-lactide) (PLLA) and polycaprolactone (PCL) can be used as the substrate and bonding and sealing materials. A combination of Zinc (Zn) and Fe can be used for the conducting layers.

Antennae are considered the fundamental RF building block of the wireless communication of the implantable devices. For an RF or antenna systems two types of materials are needed: dielectric and conductive material. For the conductive material, Magnesium (Mg) and iron (Fe) and their alloys are known to be biodegradable and are already being used in bioimplants. There are also biodegradable conductive polymer composites such as polymers poly(L-lactide) PLLA-polypyrrole (PPy) and polycaprolactone (PCL-PPy). The widely used polymers such as biodegradable polymers PLLA and PCL can be used as substrate.

Antenna design for implanted devices imposes some special challenges. The antenna needs to radiate through body tissue and surrounding that usually have very high dielectric properties that can vary from point to point. Therefore, a loading effect is present that can change the antenna's resonance frequency. A narrowband antenna can be detuned due to these changes in the dielectric properties. To mitigate this effect, ultra-wideband (UWB) antennas can be used. UWB antennas maintain their frequency bandwidth of operation and UWB signals are transmitted in the unlicensed federal communications commission (FCC) approved frequency range of 3.1-10.6 GHz. UWB systems can offer higher data-rates, lower power consumption (which can lead to longer battery life), smaller antennas, and less complexity on the transmitter side compared to narrowband systems. For wideband operation, monopole antennas have been widely used as implantable antennas.

The produced bio-based dielectric substrates improve upon existing natural fiber reinforced plastics and reduce production costs associated with other starting materials used for RFA and other microwave circuitry.

Specifically, North Dakota is the leading sunflower seed producer in the United States, producing about 45% of total U.S. production. Shells or husks of sunflower seeds are a waste by-product from the industrial processing of edible sunflower oils. Bio-based composite plastics based on the shells of sunflower seeds shells offer an innovative, less expensive and more sustainable alternative biomaterial to plastic produced purely from petroleum derivatives.

Sunflower seed shell based substrates can specifically be used for RFA and associated devices. There is exponential growth in production of wireless sensors. These devices produce two main challenges: first, finding sustainable material resources for manufacturing, and second, finding non-hazardous recyclable material. Additionally, non-metallic portions of antennae or wireless devices require dielectric materials with high permittivity (dielectric constant) and low loss factor. High dielectric constant and low loss factor are a priority for antennas and sensors' miniaturization. Bio-based dielectric substrates from sunflower seed shells can address many of these challenges.

FIG. 1 is a flow chart depicting method 10 of making bio-based dielectric substrates using blackened carbon material created from sunflower seed shells. Method 10 includes steps 12-16. Sunflower seed shells are a common bio-waste in agriculture. Method 10 thermochemically decomposes sunflower seed shells into a high quality blackened carbon material or substrate that can be used as a dielectric substrate material, for example, as RFA purposed for medical implants.

Method 10 creates a substrate using blackened carbon material created from sunflower seed shells (available from CHS Sunflower, Grandin, N.Dak.). First, in step 12, the sunflower seed shells are dried and pyrolized. This can be done, for example, in a tubular reactor, such as a Thermolyne™ 21100 tube furnace reactor, operating under an inert environment such as nitrogen, argon, or any other inert environment that a person of ordinary skill would consider to be suitable. It may be advantageous for the reactor to be made from stainless steel reactor with flanges on both sides. The reactor is preferably heated to between 300° C. and 600° C. For example, the reactor can be heated at 15° C. per minute to the desired temperature. In step 12, the substrate material ("tar") is separated from other solid material remaining ("char"), and some volatile compounds and oils evaporated throughout the pyrolizing process.

Next, in step 14, the substrate material ("tar") is recovered or collected. This can be done by condensing the tar into a smaller beaker (or other container) of water or using an equivalent step that would be known to a person of ordinary skill Finally, in step 16, the recovered substrate is dried, for instance in a vacuum oven, to form a blackened carbon material suitable for use as a substrate. A vacuum oven can provide better control, prevent oxidation, and provide a controlled humidity and moisture environment compared to other options. The completed substrate can be used to create RFA base or other materials or devices. Dielectric and mechanical properties of the sample substrate produced in FIG. 1 were analyzed, the results of which are discussed in reference to FIGS. 2A-2E.

FIGS. 2A-2E are graphs depicting data about bio-based dielectric substrates using blackened carbon material made from sunflower seed shells in method 10 of FIG. 1.

Figure 2A:
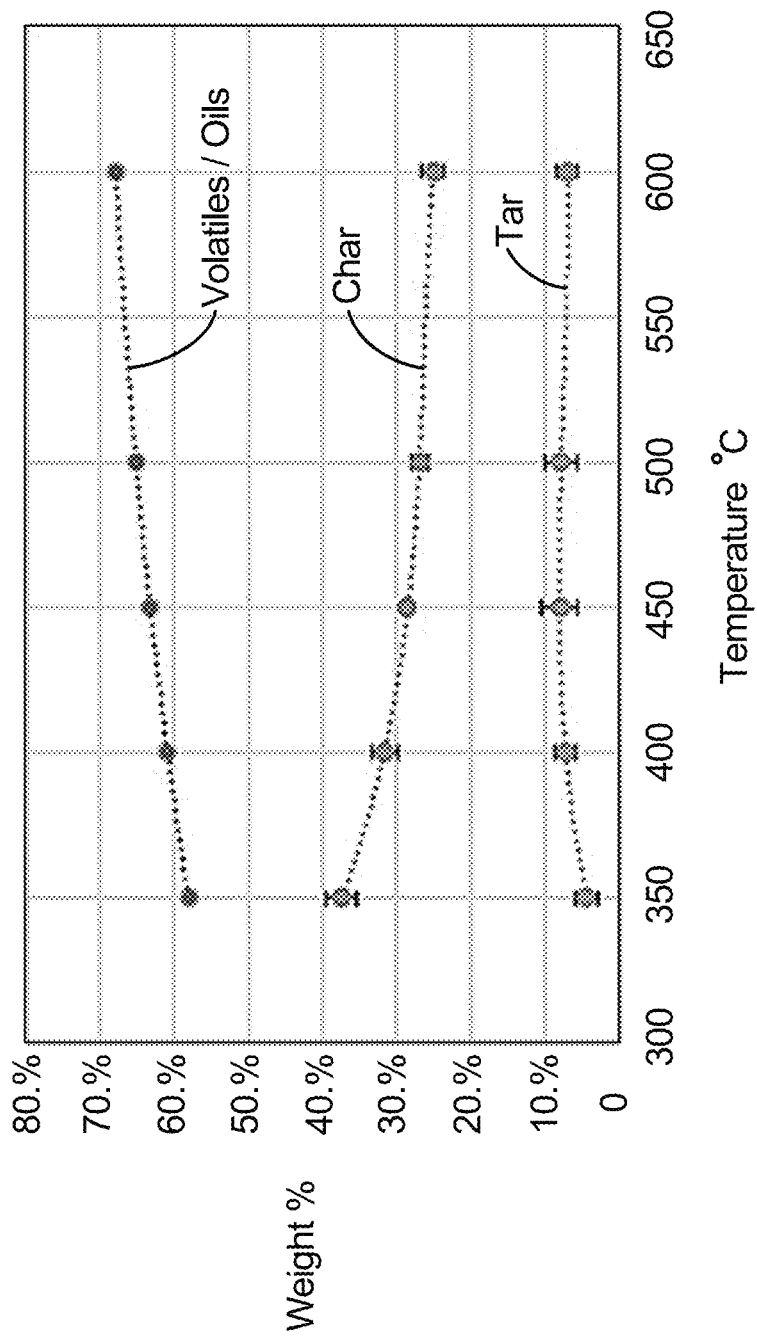
FIGS. 2A-2E are graphs depicting data about bio-based dielectric substrates made from sunflower seed shells.

FIG. 2A shows the amount of blackened carbon material or substrate ("tar") recovered from sunflower seed shells at varying temperatures during step 12 of method 10. Also shown in FIG. 2A is the amount of solid material remaining ("char") after pyrolizing the sunflower seed shells. Additionally, the amount of volatile compounds and oils was calculated as the difference between tar and char. Weight percent of tar, char, and volatiles/oils are shown in FIG. 2A as a function of temperature in degrees Celsius.

Sunflower seed shell tar recovery peaked at 8.05 wt % with a tube furnace reactor temperature of 450° C. At temperatures above 450° C., tar cracking occurred and both tar and char recoveries decreased, while the weight percent of volatiles/oils increased. Accordingly, it may be desirable to operate the reactor at a temperature between 300° C. and 450° C. Thus, the highest amount of tar recovered for substrates was at around 450° C.

FIGS. 2B-2E show varying dielectric properties of the substrate at different temperatures and compared to other materials. The dielectric properties of the substrate were measured with Keysight® Technologies dielectric high performance probes, and analyzed with varied levels of water accumulation in the substrate. Specifically, the dielectric constant (a quantity measuring the ability of a substance to resist an electrical field) and the loss tangent measurement (correlating to high dielectric absorption) were tested.

Figure 2B:
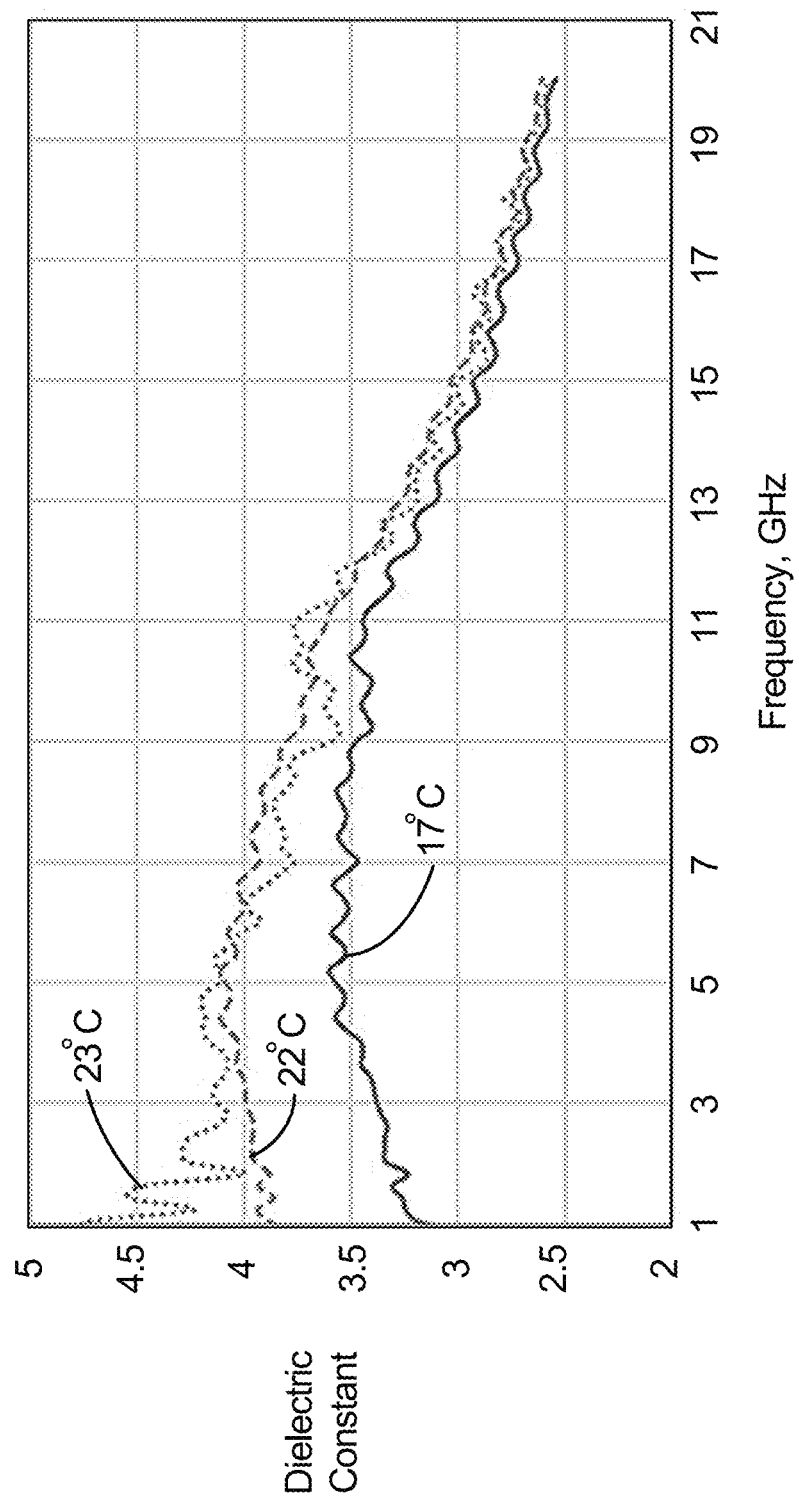

FIG. 2B shows the dielectric constant of the substrate in super high frequency (SHF) ranges (between about 0 and 20 GHz) versus frequency (in GHz) of substrates at chilled and room temperatures of 17° C., 22° C., and 23° C. The dielectric constant of substrate ranged from about 2.5 to 4.0 in SHF ranges, peaking at about 4.2 at 17° C., about 4.1 at 22° C., and about 3.6 at 23° C. Overall, the dielectric constants were higher at lower temperatures across SHF ranges.

Figure 2C:
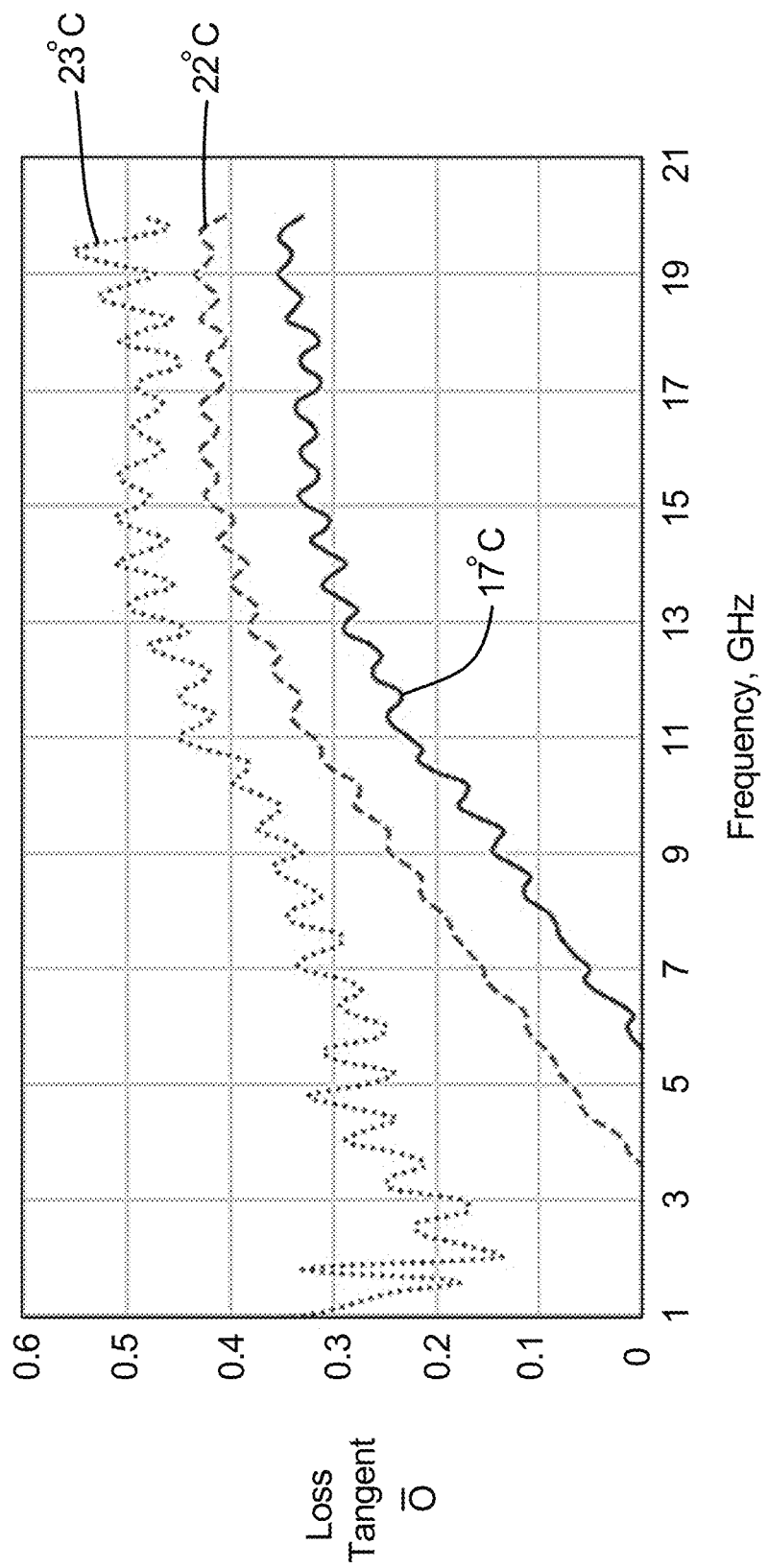

FIG. 2C shows the loss tangent measurements of the substrate in SHF ranges (between about 3 and 30 GHz) over chilled and room temperatures of 17° C., 22° C., and 23° C. The loss tangent measurement peaked at about 0.35 at 17° C., about 0.42 at 22° C., and about 0.55 at 23° C. Thus, the loss tangent peaked at 0.42 at room temperature conditions.

Figure 2D:
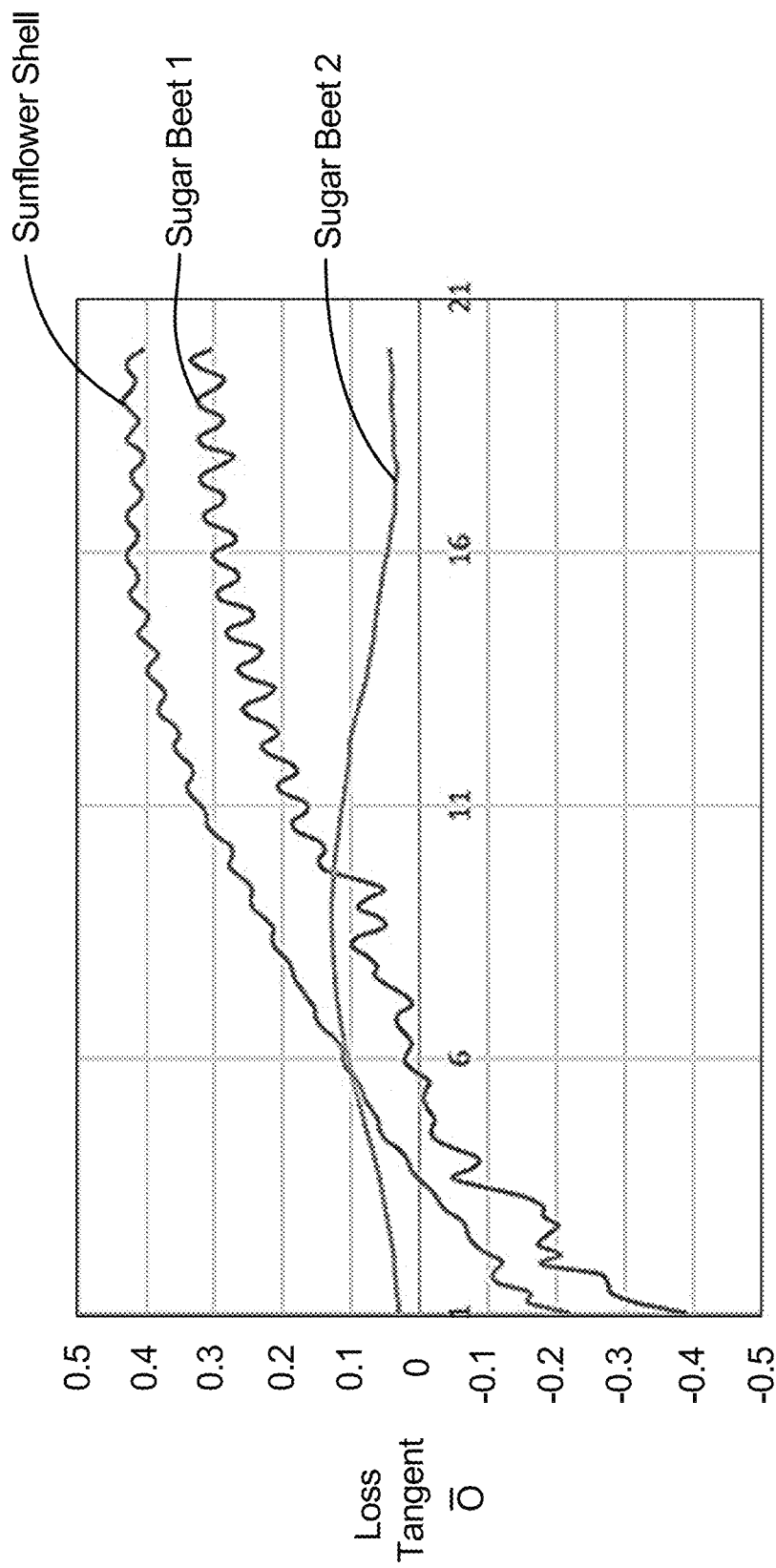
Figure 2E:
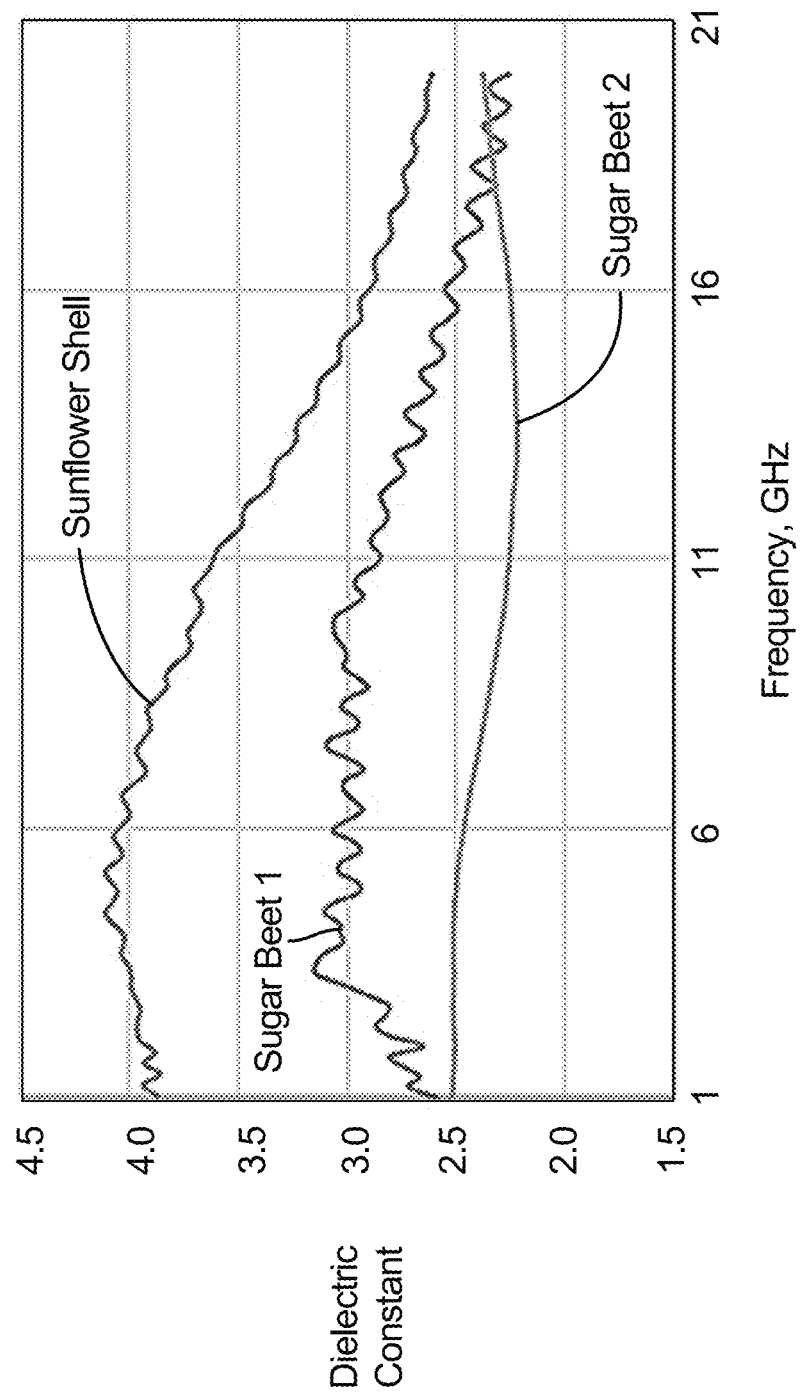

FIG. 2E compares the dielectric constant of the sunflower seed shell based substrate to the dielectric constants of sugar beet based substrates, which have been studied as another biodegradable substrate. The sugar beet substrates were tested in a similar fashion to the sunflower seed shell based substrates. FIG. 2E shows the dielectric constant over SHF ranges of the sunflower seed shell based substrate, a first sugar beet substrate, and a second sugar beet substrate.

As discussed with reference to FIG. 2B, the dielectric constant of the sunflower seed shell based substrate ranged from about 2.6 to 4.1. The dielectric constant of the first sugar beet substrate ranged from 2.2 to 3.1. The dielectric constant of the second sugar beet substrate ranged from about 2.2 to 2.5. Overall, the sunflower seed shell based substrate had the highest dielectric constant.

FIG. 2D compares the loss tangent measurement of the sunflower seed shell based substrate to the loss tangent measurement of sugar beet based substrates. FIG. 2D shows the loss tangent measurement over SHF ranges of the sunflower seed shell based substrate, a first sugar beet substrate, and a second sugar beet substrate. As discussed with reference to FIG. 2C, the loss tangent measurement of the sunflower seed shell based substrate ranged from about −0.20 to about 0.42, peaking at about 0.42. The loss tangent measurement of the first sugar beet substrate ranged from about −0.40 to about 0.32, peaking at about 0.32. The loss tangent measurement of the second sugar beet substrate ranged from about 0.03 to about 0.12, peaking at about 0.12. Overall, the sunflower seed shell based substrate at the highest loss tangent measurement.

The sunflower seed shell based substrates produced by method 10 of FIG. 1 were also mechanically tested using a nano-indentation probe, specifically a Hysitron Ubi-1 Nanoindenter (with peak load capacity of 10 mN). Reduced modulus (representing the elastic deformation in the sample), Young's modulus (the ratio of tensile strength to tensile strain, describing tensile elasticity) and Hardness values were also retrieved. Additionally, water adsorption tests were recorded. The summary of these mechanical tests is summarized in Table 1 below.

TABLE 1

Mechanical Testing of Sunflower Seed Shell Based Substrates

| Measurement | Value |
| --- | --- |
| Reduced Modulus | 0.39 GPa ± 0.09 |
| Young's Modulus | 0.35 GPa ± 0.09 |
| Hardness | 0.98 MPa ± 0.66 |
| Water Absorption | 0.45% ± 0.63 |

Overall, the average elastic deformation of the sunflower seed shell based substrate sample calculated under a Reduced Modulus was about 0.39 GPa. The tensile elasticity of the sunflower seed shell based substrate sample calculated under Young's Modulus was about 0.36 GPa. The Hardness of the sunflower seed shell based substrate sample was about 0.98 MPa. The sunflower seed shell based substrate is soft but very moldable, which is useful for RFA materials. Additionally, the water adsorption was about 0.45% using the ASTM D570 method. The water adsorption is promising for use as RFA materials.

Figure 3A:
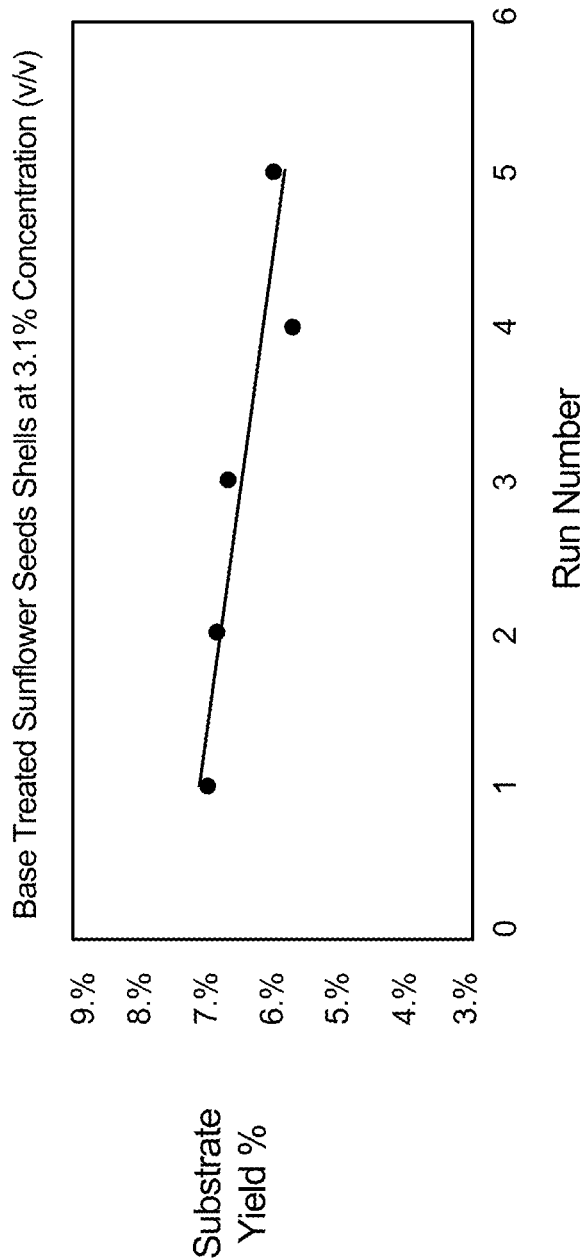
FIGS. 3A-3B are graphs depicting data about bio-based dielectric substrates treated with bases and acids.
Figure 3B:
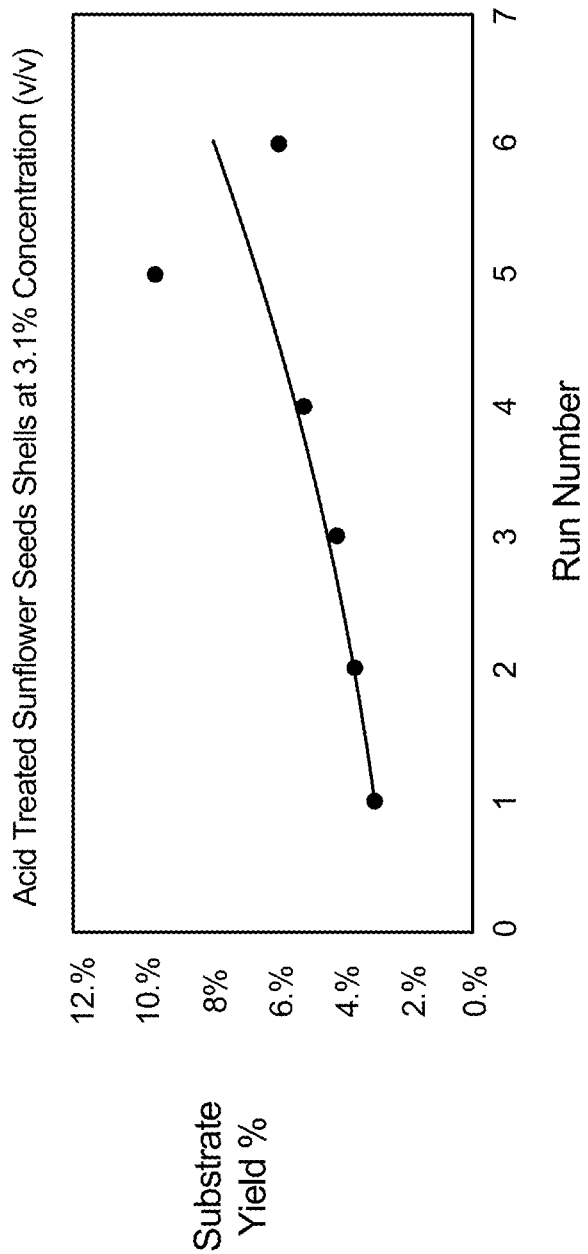

FIGS. 3A-3B are graphs depicting data about bio-based dielectric substrates treated with various bases and acids. In general bases with pKb less than one (<1) may be desirable (e.g., KOH, $Ba(OH)_2$, $Ca(OH)_2$). Acids with pKa less than one (<1) may be desirable (e.g., $HClO_4$, $H_2SO_4$, $HNO_3$, $HClO_3$).

Sunflower seed shell based substrates were treated with acids or bases prior to being prepared as substrates as described with reference to FIG. 1. Treatment with acid included using HCl at 3.1 v/v %, while treatment with base include using NaOH at 2.50 v/v %. Treatment time periods ranged between 3 to 24 hours; after which, shells were dried and loaded into the reactor. Obtained substrates from treatments were denoted as acid or base treated substrate.

FIG. 3A shows the substrate yield percent of sunflower seed shells treated with a base at 3.1% concentration. On average, the substrate yield percent was between 5.5% and 7.0%. In contrast, FIG. 3B shows the substrate yield percent of sunflower seed shells treated with an acid. On average, the substrate yield percent was between 3% and 10%, and varied greatly depending on the sunflower seed shell substrate used.

Figure 4:
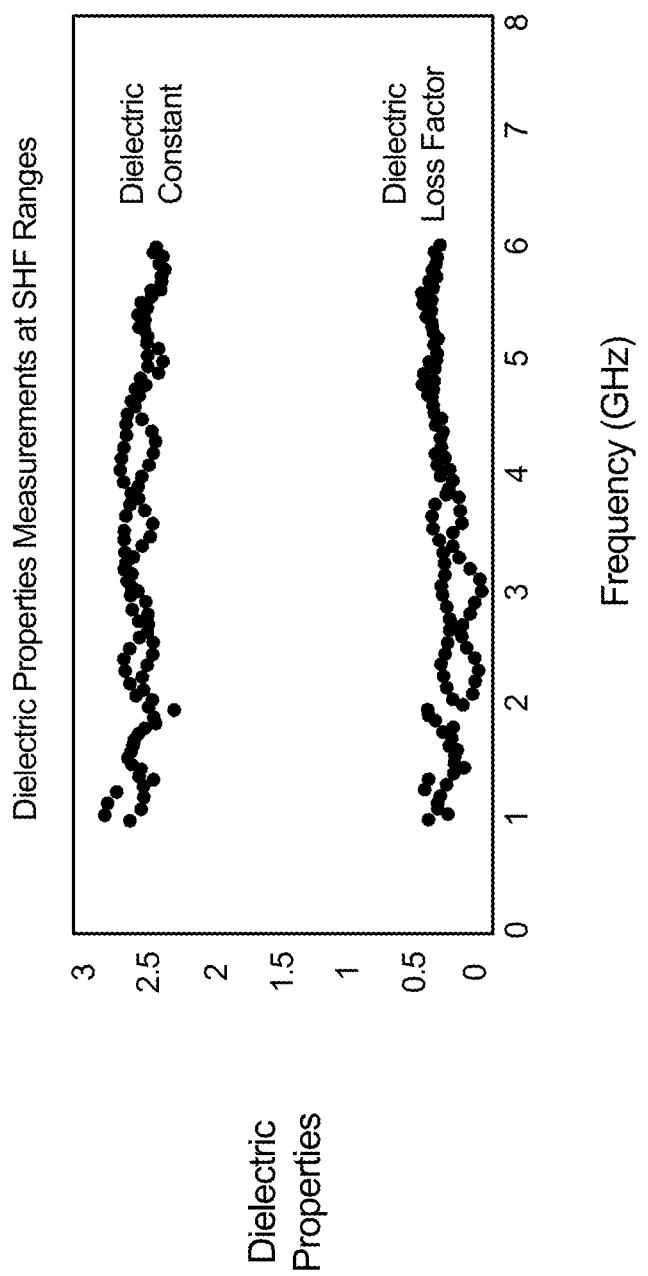
FIG. 4 is a graph depicting dielectric properties of a sunflower seed shell polymer composite substrate.

FIG. 4 is a graph depicting dielectric properties of a sunflower seed shell polymer composite substrate measured with a Keysight 85070E high-performance dielectric probe. With regards to FIG. 4, the substrates produced contained both sunflower seed shells (prepared as discussed with reference to FIG. 1), and a polymer base, this case polylactic acid (PLA). Composite samples were prepared by first weighing out sunflower seed substrate and placing it in a ceramic crucible. PLA was then added to the substrate (as a filament using PolyPlus™ PLA filaments were obtained from Polymaker Shanghai, CN) to make the desired weight ratio of 2:1 PLA weight to sunflower seed shell substrate ("tar") weight. The sample was then melted together in an oven. Once heated, the mixture was then mixed together to make the composite as homogeneous as possible. The softening point of PLA is near 180 degrees Celsius. However, the PLA was able to be mixed with the substrate better at temperatures around 220 degrees Celsius. Overall, the composite samples were prepared by melting and mixing the substrate and PLA together at 220 degrees Celsius.

FIG. 4 shows the dielectric constant at SHF ranges, as a function of frequency, of composite sunflower seed shells—PLA composite substrates. Additionally, FIG. 4 shows the dielectric loss factor as a function of field frequency. The dielectric constant of sunflower seed shell-PLA composite substrates averaged between 2.1 and 2.8. The dielectric constants were, on average, in a similar range compared to the dielectric constants of sunflower shell seed substrates not containing PLA. The dielectric loss factors was between about zero and about 0.5 for sunflower seed shell-PLA composite substrates.

Figure 5:
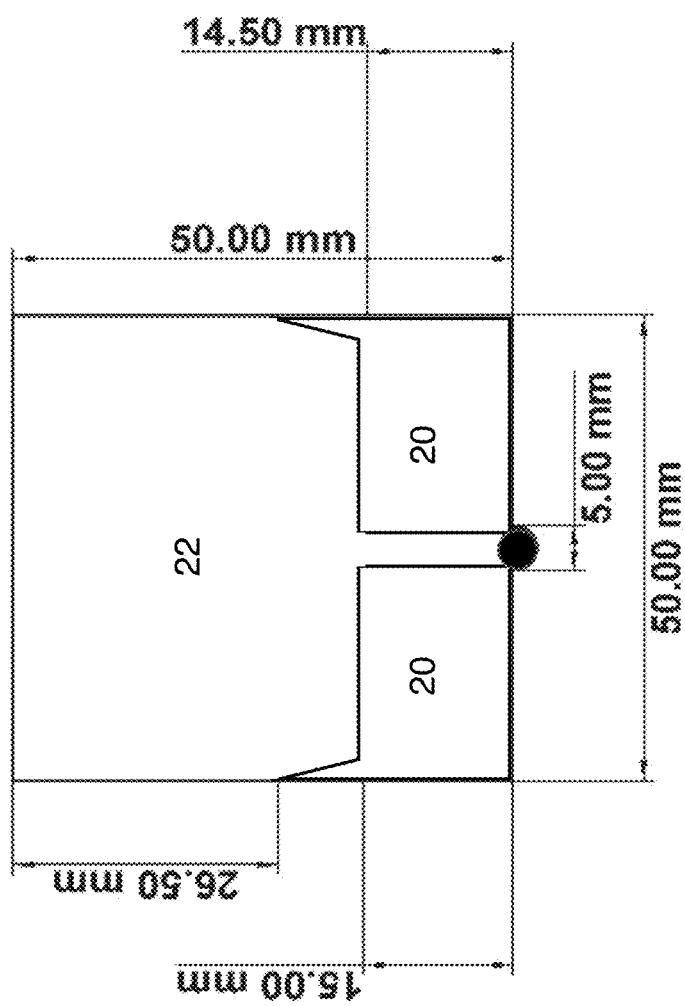
FIG. 5 is a schematic view of a monopole antenna.
Figure 6:
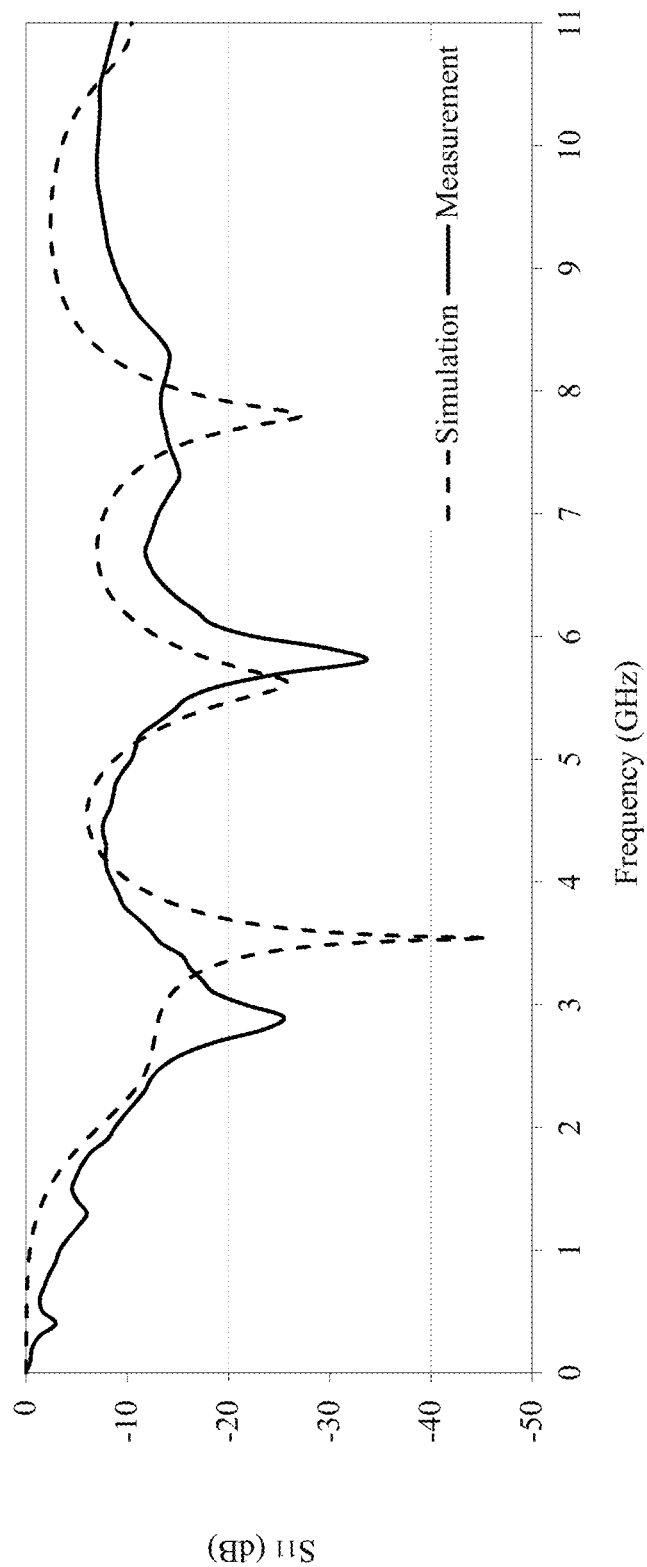
FIG. 6 is a graph depicting the reflection coefficient of the antenna of FIG. 5.

FIG. 5 shows a monopole antenna that was designed using the composite material (0.5:1 PLA:SCS) discussed above with a substrate 20 have dimensions of 50 mm×50 mm×2 mm (i.e., length×width×thickness) and a conductive material 22 (e.g., a metal or other conductive material as known in the art) overlaid on the substrate 20. Reflection coefficients ($S_{11}$) of the fabricated antenna, shown in FIG. 6, were measured in free-space using Keysight E5071C vector network analyzer (300 kHz-20 GHz frequency operating range). The $S_{11}$ parameter is used to determine the operating frequency range of the antenna (i.e., antenna bandwidth) and the resonance frequencies. experimental values as depicted in FIG. 6 agreed fairly well with numerical simulation results.

Figure 7:
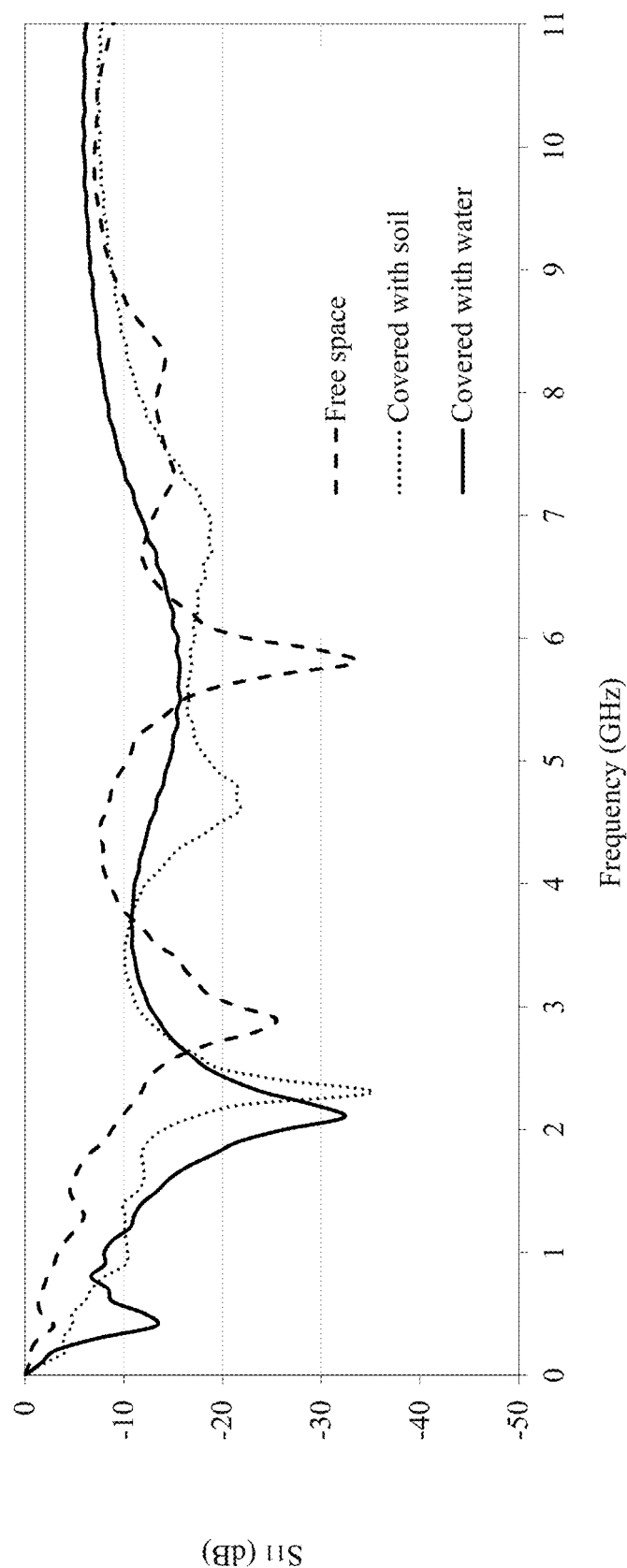
FIG. 7 is a graph depicting the resonance frequency of the antenna of FIG. 5.

To mimic the biomedical and agricultural applications, reflection coefficient ($S_{11}$) of the fabricated antenna was measured with the antenna in water, and in wet soil. Placing the antenna in different materials creates a loading effect that can be used for sensing the humidity of the material. As shown in FIG. 7, the resonance frequency of the antenna is shifted as a layer of water or wet soil is placed on top of it. With a mapping, the phenomena can be used to measure humidity of the material. It is worth mentioning that the average relative permittivity of the wet soil and water are 15 and 80, respectively.

Figure 8:
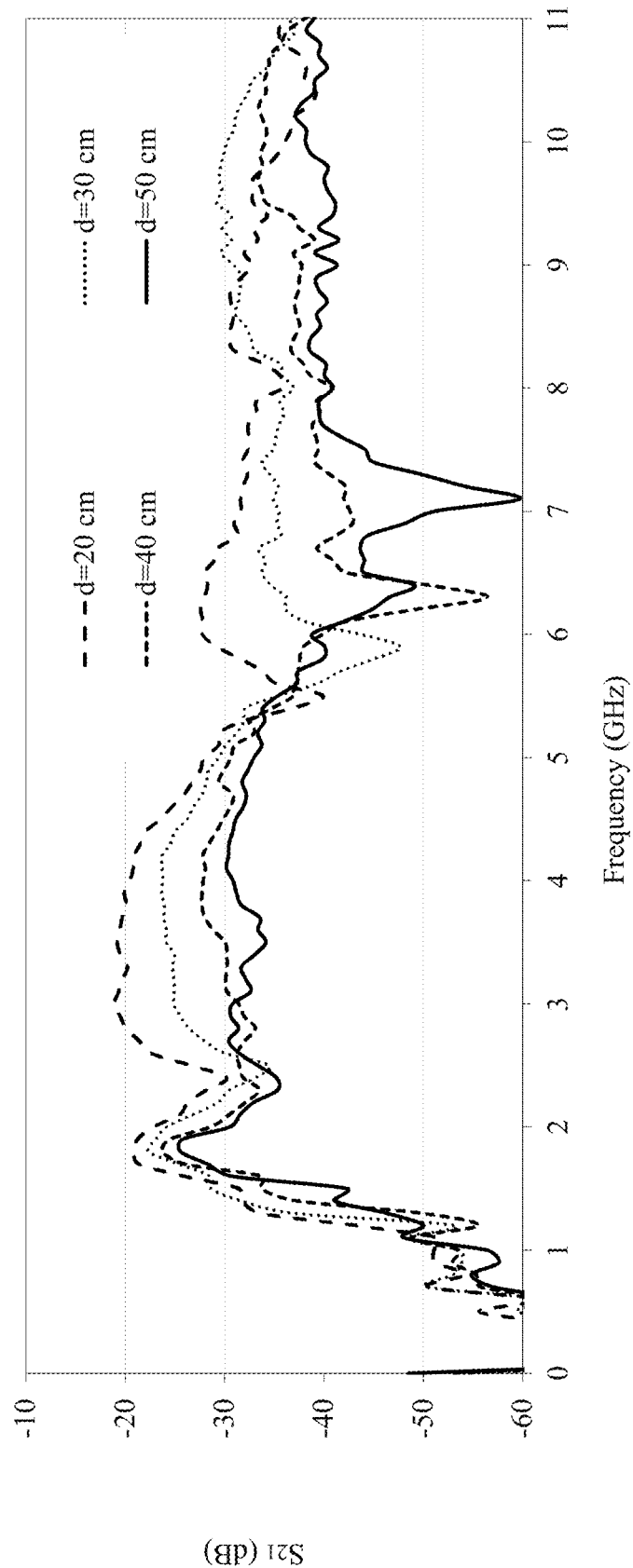
FIG. 8 is a graph depicting the transmission coefficient of the antenna of FIG. 5.

For using this antenna in a communication link, the transmission coefficient ($S_{21}$) was measured in free space for different distances using a JXTXLB-20180 double ridged horn antenna with an impedance bandwidth of (2 GHz-18 GHz). The distance (d) between the antennas is changed in range (20 cm-50 cm) and $S_{21}$ results are shown in FIG. 8. As expected, the larger the distance between the antennas, the more losses in the communication link are observed, however, this loss is minimum at the resonance frequency.

Overall, the sunflower seed shell based substrates are soft but malleable substances that have relatively low dielectric constants. Bio-based dielectric substrates produced using sunflower seed shells as the starting material are advantageous for RFA due to the substrates' moldability, which allows for injection molding, great resistance to moisture, and small coefficient of thermal expansion, which prevents unwanted thermal stresses. Additionally, these bio-based dielectric substrates offer sufficient stiffness and useable coefficients of thermal expansion.

Production of bio-based dielectric substrates using sunflower seed shells is very cost effective. In particular, there is a large quantity of sunflower seed shells available, and sunflower seed shell based substrates can be used to create RFA or other products useful in agricultural and medical applications.

Discussion of Possible Embodiments

The following are non-exclusive descriptions of possible embodiments of the present invention.

An article includes a dielectric substrate comprising blackened carbon material created from pyrolized sunflower seed shells.

The article of the preceding paragraph can optionally include, additionally and/or alternatively, any one or more of the following features, configurations and/or additional components:

The dielectric substrate has a dielectric constant between about 2.5 to about 4.0 in super high frequency ranges.

The dielectric substrate has a loss tangent measurement of about 0.00 to about 0.42 in super high frequency ranges.

The dielectric substrate has a reduce modulus measurement of about 0.39 GPa.

The dielectric substrate has a Young's modulus measurement of about 0.35 GPa

The dielectric substrate has a hardness of about 0.98 MPA

The dielectric substrate has a water absorption of about 0.45 percent.

The article includes polylactic acid.

A method of making a dielectric substrate includes drying sunflower seed shells, pyrolizing the sunflower seed shells into tar, char, and volatile compounds, collecting the tar, and drying the tar into a dielectric substrate.

The method of the preceding paragraph can optionally include, additionally and/or alternatively, any one or more of the following features, configurations and/or additional components:

Pyrolizing the sunflower seed shells comprises pyrolizing in a tube furnace reactor.

Pyrolizing the sunflower seed shells comprises pyrolizing in an inert environment Pyrolizing the sunflower seed shells comprises pyrolizing temperature between 350 degrees Celsius and 600 degrees Celsius.

Pyrolizing the sunflower seed shells comprises pyrolizing at 450 degrees Celsius.

Collecting the tar comprises condensing the tar with water.

Drying the tar into a dielectric substrate comprises using a vacuum oven.

The method includes treating the sunflower seed shells with an acid.

The method includes treating the sunflower seed shells with a base.

A biodegradable radio frequency antenna includes a dielectric substrate having a blackened carbon material created from pyrolized sunflower seed shells. The dielectric substrate has a dielectric constant of between about 2.5 to about 4.0 in super high frequency ranges, a loss tangent measurement of about 0.00 to about 0.42 in super high frequency ranges, a reduce modulus measurement of about 0.39 GPa, a Young's modulus measurement of about 0.35 GPa, a hardness of about 0.98 MPa, and a water absorption of about 0.45 percent.

The article of the preceding paragraph can optionally include, additionally and/or alternatively, any one or more of the following features, configurations and/or additional components:

The biodegradable radio frequency antenna further includes polylactic acid.

The biodegradable radio frequency antenna is incorporated into an agricultural monitoring system, a medical implant, a sensor, or microwave component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An article comprising:
   a dielectric substrate comprising blackened carbon material created from pyrolized sunflower seed shells, wherein the dielectric substrate has a dielectric constant between about 2.5 and 4.0 in super high frequency ranges.

2. The article of claim 1, wherein the dielectric substrate has a loss tangent measurement of about 0.00 to about 0.42 in super high frequency ranges.

3. The article of claim 1, wherein the dielectric substrate has a reduce modulus measurement of about 0.39 GPa.

4. The article of claim 1, wherein the dielectric substrate has a Young's modulus measurement of about 0.35 GPa.

5. The article of claim 1, wherein the dielectric substrate has a hardness of about 0.98 MPA.

6. The article of claim 1, wherein the dielectric substrate has a water absorption of about 0.45 percent.

7. The article of claim 1, further comprising polylactic acid.

8. A method of making an article comprising:
drying sunflower seed shells;
pyrolizing the sunflower seed shells into tar, char, and volatile compounds;
collecting the tar;
drying the tar into a dielectric substrate, wherein the dielectric substrate has a dielectric constant between about 2.5 and 4.0 in super high frequency ranges.

9. The method of claim 8, wherein pyrolizing the sunflower seed shells comprises pyrolizing in a tube furnace reactor.

10. The method of claim 8, wherein pyrolizing the sunflower seed shells comprises pyrolizing in an inert environment.

11. The method of claim 8, wherein pyrolizing the sunflower seed shells comprises pyrolizing at a temperature between 350 degrees Celsius and 600 degrees Celsius.

12. The method of claim 11, wherein pyrolizing the sunflower seed shells comprises pyrolizing at a temperature between 350 degrees Celsius and 450 degrees Celsius.

13. The method of claim 8, wherein collecting the tar comprises condensing the tar with water.

14. The method of claim 8, wherein drying the tar into a dielectric substrate comprises using a vacuum oven.

15. The method of claim 8, further comprising treating the sunflower seed shells with an acid.

16. The method of claim 8, further comprising treating the sunflower seed shells with a base.

17. A biodegradable radio frequency antenna comprising:
a dielectric substrate comprising blackened carbon material created from pyrolized sunflower seed shells
wherein the dielectric substrate has a dielectric constant of between about 2.5 to about 4.0 in super high frequency ranges, a loss tangent measurement of about 0.00 to about 0.42 in super high frequency ranges, a reduce modulus measurement of about 0.39 GPa, a Young's modulus measurement of about 0.35 GPa, a hardness of about 0.98 MPa, and a water absorption of about 0.45 percent.

18. The biodegradable radio frequency antenna of claim 17, further comprising polylactic acid.

19. The biodegradable radio frequency antenna of claim 17, wherein the antenna is incorporated into an agricultural monitoring system, a medical implant, a sensor, or microwave component.

20. The article of claim 1, wherein the super high frequency range is between about 0 GHz and about 20 GHz.

* * * * *